(12) United States Patent
Wang et al.

(10) Patent No.: US 11,774,183 B2
(45) Date of Patent: Oct. 3, 2023

(54) HEAT TRANSFERRING DEVICE AND METHOD FOR MAKING THEREOF

(71) Applicant: City University of Hong Kong, Hong Kong (HK)

(72) Inventors: Zuankai Wang, Hong Kong (HK); Mengnan Jiang, Hong Kong (HK); Yang Wang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 14 days.

(21) Appl. No.: 17/463,567

(22) Filed: Sep. 1, 2021

(65) Prior Publication Data

US 2022/0065552 A1    Mar. 3, 2022

Related U.S. Application Data

(60) Provisional application No. 63/072,995, filed on Sep. 1, 2020.

(51) Int. Cl.
*F28D 17/02* (2006.01)

(52) U.S. Cl.
CPC .................................. *F28D 17/02* (2013.01)

(58) Field of Classification Search
CPC .......... F28F 13/003; F28F 13/187; F28F 1/12; F28F 1/122; F28F 1/124; F28F 13/18; F28F 13/185; F28F 1/10–44; H05K 7/20309; H05K 7/20336; H01L 23/3672; H01L 23/3677; H01L 23/3733; F28D 2021/0029; F28D 15/04; F28D 15/046
See application file for complete search history.

(56) References Cited

U.S. PATENT DOCUMENTS

| | | | | |
|---|---|---|---|---|
| 4,359,086 A | * | 11/1982 | Sanborn | F28F 13/187 165/907 |
| 5,455,382 A | * | 10/1995 | Kojima | H01L 23/3677 257/722 |
| 2002/0108743 A1 | * | 8/2002 | Wirtz | H01L 23/3733 257/722 |
| 2008/0314576 A1 | * | 12/2008 | Meng | H05K 7/20154 165/185 |
| 2020/0149829 A1 | * | 5/2020 | Watanabe | H01L 23/3733 |
| 2020/0187392 A1 | * | 6/2020 | Joshi | H01L 23/3736 |
| 2020/0208926 A1 | * | 7/2020 | Kao | H01L 21/4882 |

FOREIGN PATENT DOCUMENTS

| | | | | |
|---|---|---|---|---|
| JP | 2012009482 A | * | 1/2012 | |
| WO | WO-2019241223 A1 | * | 12/2019 | B01D 5/0027 |

OTHER PUBLICATIONS

Thermal Conductivity of Solders _ Electronics Cooling—Wilson (Aug. 1, 2006) (Year: 2006).*

* cited by examiner

*Primary Examiner* — Jenna M Hopkins
(74) *Attorney, Agent, or Firm* — Idea Intellectual Limited; Margaret A. Burke; Sam T. Yip

(57) ABSTRACT

The present invention provides a heat transferring device and a method for making thereof. The heat transferring device has a thermal conducting substrate and a porous layer. The thermal conducting substrate has a plurality of protrusions and concave bottom surfaces. The concave bottom surfaces are located between the protrusions. The porous layer is embedded between the protrusions. The present invention also provides a high temperature material transferring system comprising a cylindrical container and the heat transferring device disposed on the surface of the cylindrical container.

14 Claims, 11 Drawing Sheets

HEAT TRANSFERRING DEVICE AND METHOD FOR MAKING THEREOF

CROSS-REFERENCE TO RELATED APPLICATION

This application claims priority to U.S. Provisional Utility Patent Application No. 63/072,995 filed Sep. 1, 2020; the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to techniques and mechanisms for transferring thermal energy. More particularly, the present invention relates to phase change heat transfers.

BACKGROUND

A stable, controllable, and highly efficient phase change heat transfer is crucial for many high temperature applications in consumer, commercial, industrial, and research facilities and products, such as quenching, fire-extinguishing, cooling for power plants, smelting plants, refinery, computer data centers, combustion engines, jet engines, and explosion chambers. Many strategies have been proposed to enhance phase change heat transfer on high temperature surface.

However, on a high temperature surface (i.e., above 300° C.), one of the bottlenecks of enhancing phase change transfer performance is the Leidenfrost effect. The Leidenfrost effect is a physical phenomenon in which liquid, when placed close to a surface that is significantly hotter than the liquid's boiling point, produces an insulating vapor layer that keeps the liquid from boiling rapidly. Because of this "repulsive force", droplets hover over the surface rather than making physical contact with the hot surface. The thermal insulating vapor layer prevents liquid-solid contact and severely deteriorates the heat transfer performance.

SUMMARY OF THE INVENTION

It is an objective of the present invent to provide a novel and general architecture that can suppress the Leidenfrost effect even on surfaces with ultrahigh temperature up to the melting point of the material used in the architecture, while without compromising the heat transfer in the entire temperature range. Under the various embodiments of the present invention, when a liquid droplet (i.e., of ~170 µL in volume) impacts on the architecture with a broad temperature, for example, ranging from 100° C. to 1,200° C., the droplet always exhibits rapid spreading, intense boiling, and rare splashing instead of creating the insulating vapor layer. As such, the droplet's evaporation times are almost constant, giving a characteristic timescale of less than 1 s under a wide temperature range of 200-1,200° C., in contrast to several tens of seconds on flat surface when temperature is higher than −200° C. owing to Leidenfrost effect.

The present invention provides a heat transferring device and a high temperature material transferring system. The heat transferring device has a thermal conducting substrate and a porous layer. The thermal conducting substrate has a plurality of protrusions and curved (or concave) bottom surfaces. The concave bottom surfaces are located between the protrusions. The porous layer is embedded between the protrusions.

The high temperature material transferring system includes a cylindrical container and the heat transferring device. The heat transferring device is disposed on the surface of the cylindrical container.

The present invention also provides a method of forming a heat transferring device. The method includes providing a thermal conducting substrate; forming a plurality of protrusions and concave bottom surfaces between the protrusions; and embedding a porous layer between the protrusions.

In an embodiment of the present invention, the placement of porous layer is suspended from the concave bottom surfaces, creating gap spaces in between the bottom side of porous layer and the concave bottom surfaces; the material of the protrusions has a high thermal conductivity; the concave bottom surfaces form a plurality of first grooves and second grooves; the first grooves intersect the second grooves; the first and second grooves have a U-shape profile; the protrusions form an array; the circumference of each of the protrusions increases in a direction towards its bottom, forming a pyramid or frustum; the material of the porous layer is inorganic; the material of the porous layer has a thermal conductivity that is N times smaller than a thermal conductivity of a material of the protrusions, and N is within a range from 100 to 1,000; the porous layer is made of thermally insulating material; and the step of forming the protrusions comprises: wire-cutting the thermal conducting substrate with a Molybdenum wire, or micro-milling the thermal conducting substrate.

BRIEF DESCRIPTION OF THE DRAWINGS

Embodiments of the invention are described in more details hereinafter with reference to the drawings, in which.

DETAILED DESCRIPTION

In the following description, devices for facilitating heat transfer and methods for making thereof and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
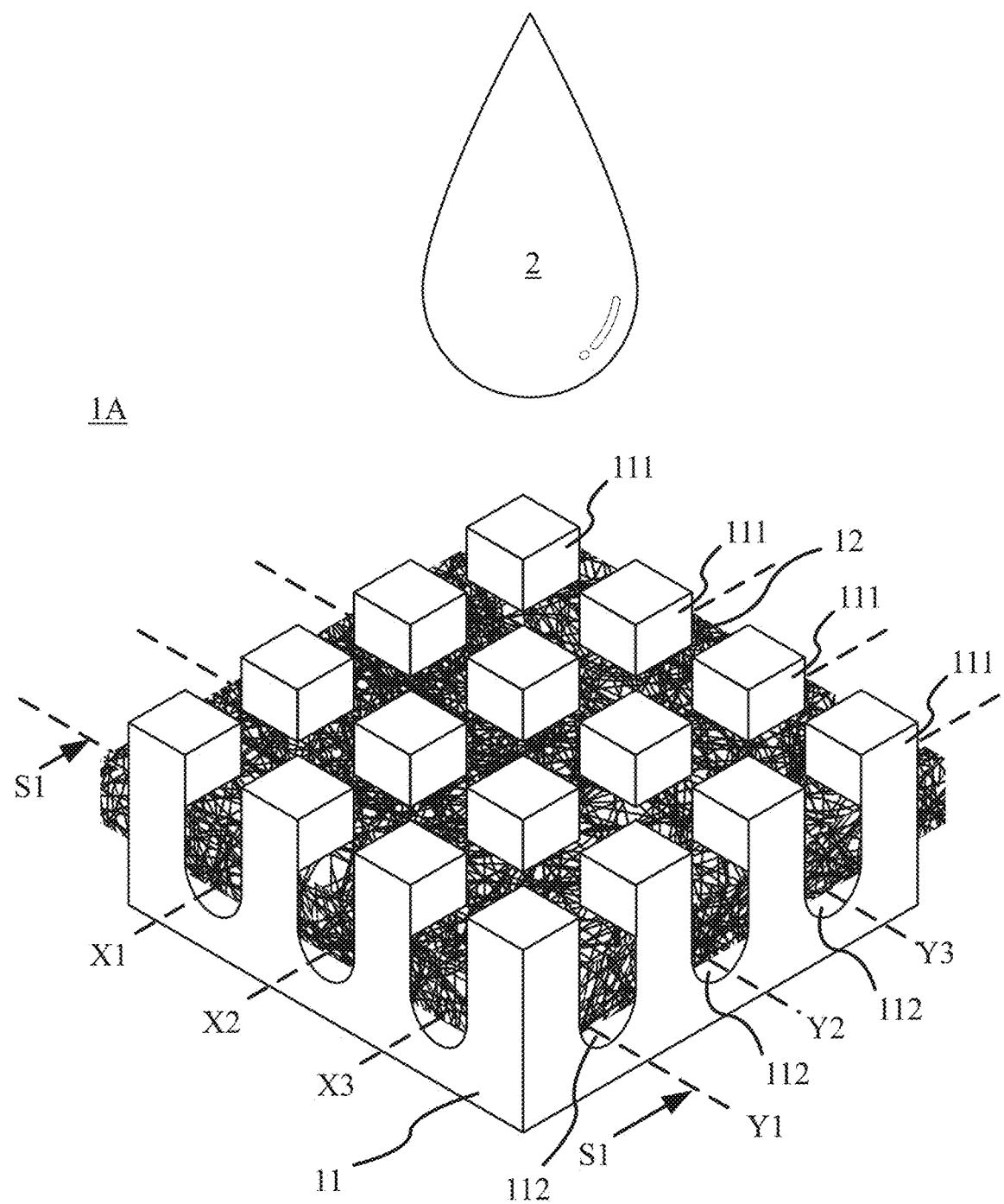
FIG. 1 depicts a perspective view of a heat transferring device in accordance with one embodiment of the present invention.
Figure 2:
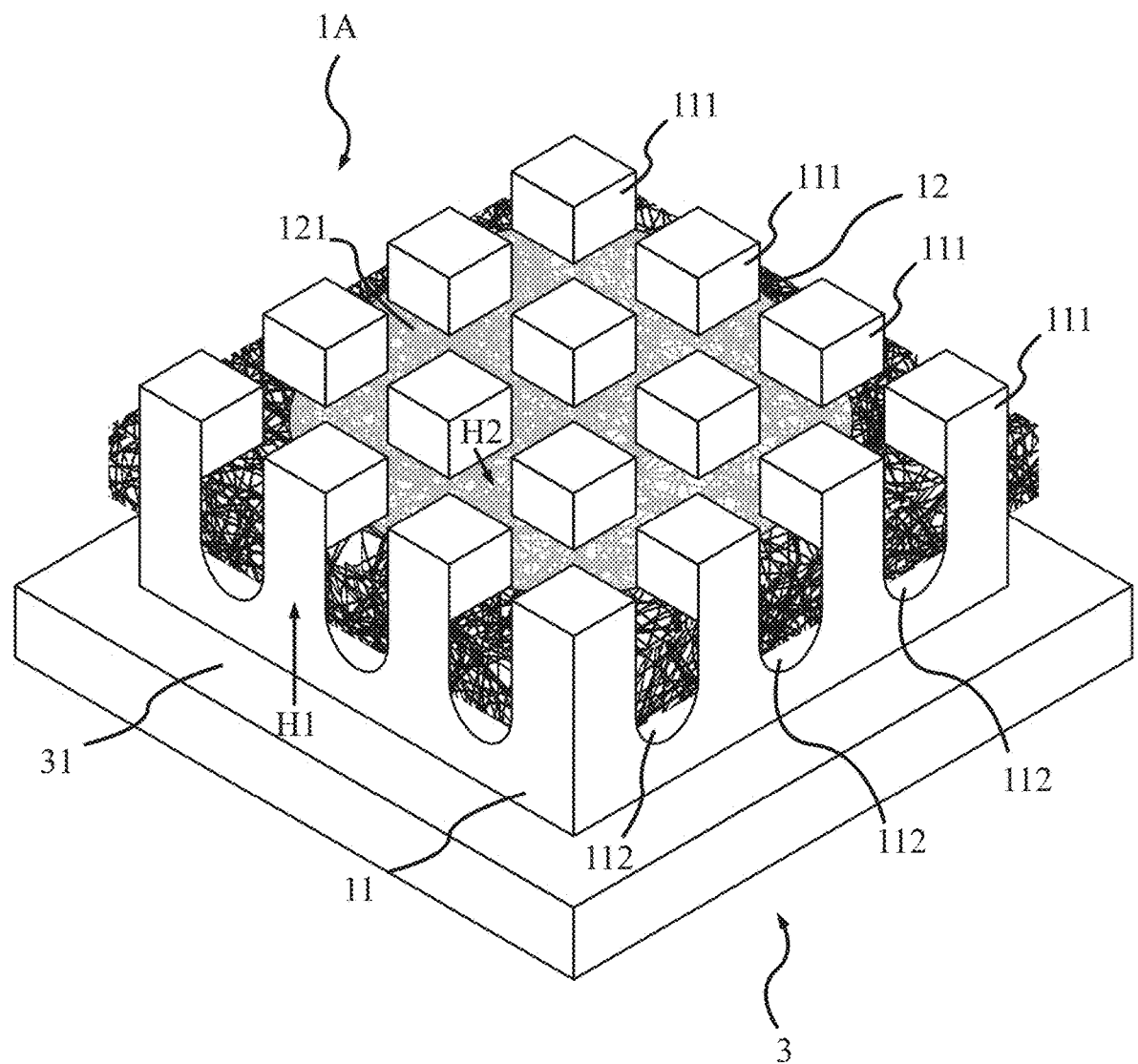
FIG. 2 depicts another perspective view of a heat transferring device in accordance with one embodiment of the present invention.

FIG. 1 and FIG. 2 show the perspective views of a heat transferring device 1A in accordance with an embodiment of the present invention. The heat transferring device 1A has a thermal conducting substrate 11 and a porous layer 12.

The thermal conducting substrate 11 has a plurality of protrusions 111 and concave bottom 112. In this embodiment, the protrusions 111 and the curved (or concave) bottom surfaces 112 are formed on the same side of the thermal conducting substrate 11. The concave bottom surfaces 112 are located between the protrusions 111. In other words, between any of the protrusions 111 and the other adjacent protrusion 111, a concave bottom surface 112 is formed between the bottoms of two protrusions 111.

The porous layer 12 is embedded between the protrusions 111. In this embodiment, the protrusions 111 stab or poke through the porous layer 12, and the porous layer 12 is secured to the thermal conducting substrate 11 by the protrusions 111.

In this embodiment, when water droplet 2 impacts on the porous layer 12 of the heat transferring device 1A with a broad temperature range from approximately 100 to 1,200° C., the droplet always exhibits rapid spreading, intense boiling, and rare splashing instead of Leidenfrost phenomenon. In other words, the water droplet 2 smears in the porous layer 12, and, when the heat transferring device 1A is attached on surface 31 of cylindrical container 3 (only part of the layer and outer surface of the cylindrical container 3 is shown in the figure), the thermal conducting substrate 11 absorbs the heat H1 from the cylindrical container 3, and the smeared area 121 further absorbs the heat H2 without forming an insulating vapor layer.

Also, protrusions 111 of the thermal conducting substrate 11 may act as a "thermal bridge" to "short circuit" the thermal flow directly from the thermal conducting substrate 11 to the liquid in the porous layer 12. Meanwhile, the porous layer 12 is made of thermally insulating material, and the porous layer 12 with sufficient capillary force wicks and spreads the liquid, further improving the efficiency of heat dissipation.

More specifically, the bottom side, which is opposite to the side having the protrusions 111, of the thermal conducting substrate 11 may contact a high-temperature material transferring system (i.e., the cylindrical container 3). The high-temperature material transferring system may be, without limitation, a power generator or reactor and piping thereof, a smelter, an explosion chamber, an engine cooling system, or a computer cooling system. When the thermal conducting substrate 11 absorbs the heat from the device, the heat may be transfer to the liquid in the porous layer 12 effectively. After the liquid, such as water, changes its phase to gas phase, heat from the high-temperature device is dissipated.

Together, the synergistic cooperation between the protrusions 111 and the porous layer 12 achieve the dramatic boost in the Leidenfrost temperature point without sacrificing its heat transfer performances, resolving the conflicting requirement on heat transfer and wickability.

The material of the thermal conducting substrate 11 has high thermal conductivity. That is, the material of the protrusions has high thermal conductivity. In one embodiment, the thermal conducting substrate 11 is made of steel, a good thermal conductor with the thermal conductivity of ~25 $W \cdot m^{-1} \cdot K^{-1}$. In other embodiments, the material of the thermal conducting substrate 11 may be iron-based, nickel based, cobalt-based, zirconium-based, titanium-based material, or tungsten, rhenium, molybdenum, niobium, or metal ceramic material, or silicon nitride, carbon nitride, tantalum carbide, or hafnium carbide.

A material of the porous layer 12 is inorganic. For example, the material may be silicon dioxide. To be specific, the porous layer 12 may be fabricated via electrospinning technique, and the porous layer 12 is composed of $SiO_2$ composite, which endows the layer 12 with flexibility and high-temperature tolerance of up to, for example, ~1,200° C., which is the melting point of the $SiO_2$ composite. The porous layer 12 comprises nanofibers and these nanofibers interweave together, forming inter-fiber pores with an average diameter of ~2 m and leading to the high porosity of the layer 12 (~0.95). Moreover, large roughness generated by the fibrous structure makes the hydrophilic layer with an intrinsic contact angle of ~30 degree to be super-hydrophilic.

In this embodiment, the thermal conductivity of the material of the porous layer 12 is about 0.02 $W \cdot m^{-1} \cdot K^{-1}$, which is about 1,000 times smaller than that of the material of the thermal conducting substrate 11. To be more specific, the porous layer 12 is made of thermally insulating material. Thus, the protrusions 111 of the thermal conducting substrate 11 act as a "thermal bridge" to "short circuit" the thermal flow directly from high temperature thermal conductive substrate 11 to the droplet 2.

In various embodiments, the porous layer 12 may be made of carbon fibers, aramid fibers, glass fibers, basalt fibers, polybenzimidazole (PBI) fibers, or ultra-high-molecular-weight-polyethylene (UHMWPE). In other embodiments, the porous layer 12 may include one or more of porous film made of fiber, ceramic, and metal. In some other embodiments, the material of the porous layer 12 may include one or more of silicon dioxide, titanium dioxide, mullite, aluminum oxide, zirconium dioxide, yttrium oxide, and asbestos. In still some other embodiments, the porous layer 12 is of felt or aerogel. In some embodiments, the thermal conductivity of the material of the porous layer 12 is about N times smaller than that of the material of the thermal conducting substrate 11, and N is within a range from 100 to 1,000.

Figure 3:
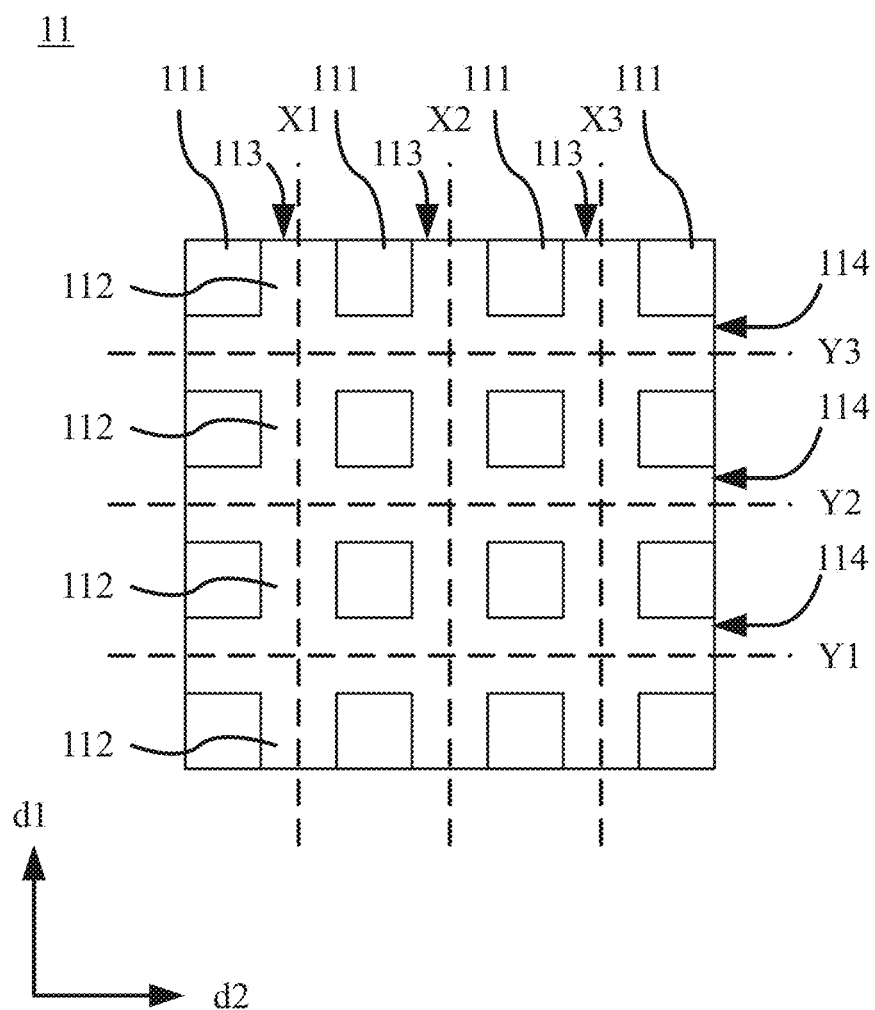
FIG. 3 depicts a top view of the thermal conducting substrate in accordance with one embodiment.

FIG. 3 is a top view of the thermal conducting substrate 11 of an embodiment. In this embodiment, the protrusions 111 form an array, and the concave bottom surfaces 112 form a plurality of grooves 113 and grooves 114; and the grooves 113 intersect the grooves 114.

More specifically, the grooves 113 extend along the axis X1, X2, and X3 respectively, and the axis X1, X2, and X3 are parallel to direction d1. The grooves 114 extend along the axis Y1, Y2, and Y3 respectively, and the axis Y1, Y2, and Y3 are parallel to direction d2. The direction d1 is perpendicular to the direction d2, and the grooves 113 intersect the grooves 114.

Figure 4:
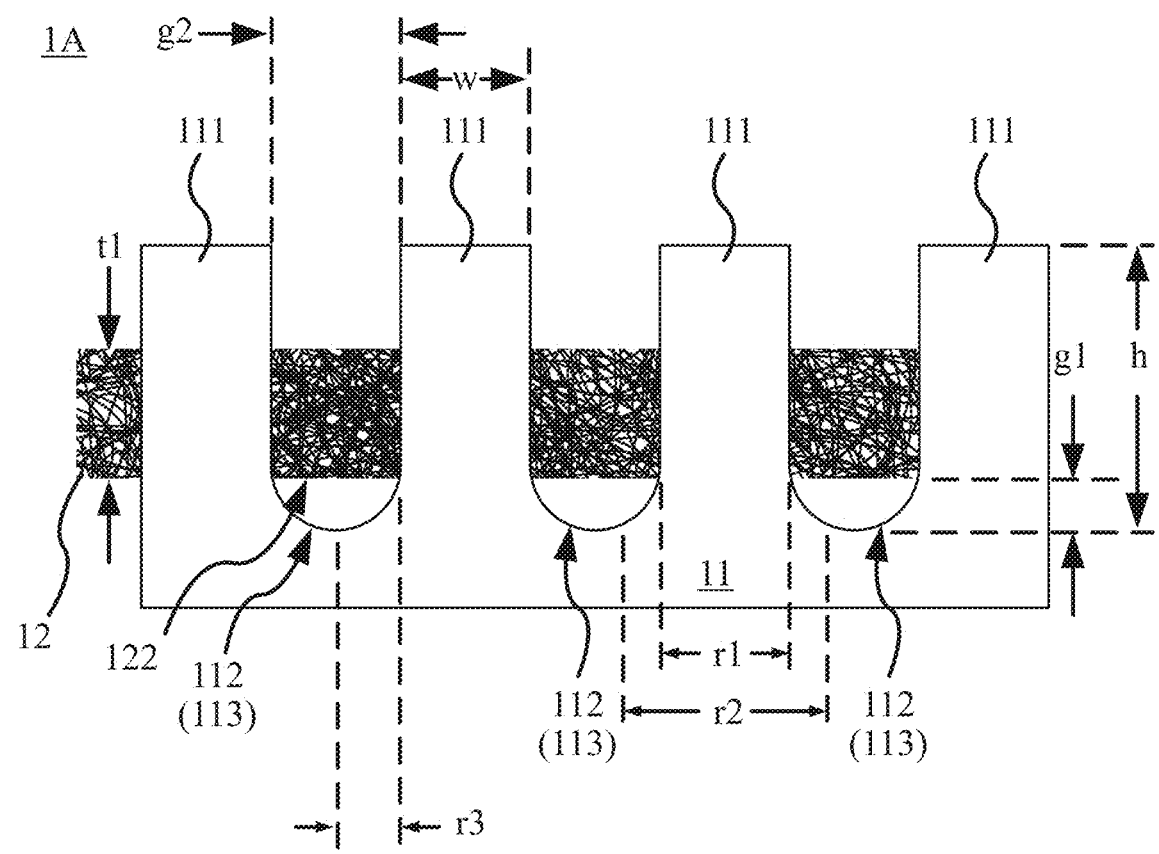
FIG. 4 depicts a side sectional view of the heat transferring device taken along a cutting plane line S1 in FIG. 1.

FIG. 4 is a side sectional view of the heat transferring device 1A taken along a cutting plane line S1 in FIG. 1. The bottom side of the porous layer 12 keeps a gap g1 from each of the concave bottom surface 112. Vapor channels are formed between the concave bottom surfaces 112 and the bottom surface 122 of the porous layer 12.

In this embodiment, the grooves 113, 114 have U-shape profile, and a sufficient tunnel is provided for vapor exhausting. The vapor channels can prevent the water droplet from bouncing away from the porous layer 12. In other words, the "U" shaped grooves 113, 114 between the porous layer 12 and the thermal conducting substrate 11 are used for exhausting vapor. Therefore, liquid may stay in the porous layer 12 and absorbs heat from the protrusions 111 of the thermal conducting substrate 11.

Moreover, the circumference of each of the protrusions 111 increases towards its bottom. In this embodiment, width r1 of the protrusion 111 near its top is smaller than width r2 of the protrusion 111 near its bottom. The "U" shaped groove 113 forms a fillet (i.e., the concave bottom surface 112) at valley in between the protrusions 111. These increasing circumferences of the protrusions 111 towards their bottoms prevent the porous layer 12 from moving downward by the pushing force exerted on it during the droplets' impact.

For example, the fillet radius r3 is approximately 0.15±0.02 mm, and the width w, spacing g2, and height h of protrusions 111 are approximately 300 μm, 300 μm, and 400 μm, respectively. The density of protrusions 111 is high enough to transfer the heat, and the grooves 113, 114 are wide enough for water droplet to spread and smear on the porous layer 12.

For another example, the fillet radius r3 is approximately 1.0±0.02 mm, and the width w, spacing g2, and height h of protrusions are approximately 2.0 mm, 2.0 mm, and 4.0 mm, respectively, and the heat transferring device 1A can applied to quenching, fire-extinguishing, cooling for power plants, smelting plants, combustion engines, jet engines, and explosion chambers. In other words, the fillet radius r3 may be within a range from 0.13 mm to 1.0 mm, and the width w may be within a range from 300 μm to 3000 μm, and the spacing g2 may be within the range from 300 μm to 3000 μm, and the height h may be within the range from 400 μm to 4000 μm.

The porous layer 12 has a thickness t1, and the porous layer 12 provides 3-dimensional channels. The 3-dimensional channels provide a fast radial and vertical wicking during a droplet contact, and the channels dramatically enhances liquid spreading area and heat transfer performance. In other words, the porous layer includes a plurality of 3-dimensional channels.

Also, the thickness t1 of the porous layer 12 is less than a height h of every protrusion 111, and the circumference of each of the protrusions 111 increases in a direction towards its bottom, forming a pyramid or frustum, such that the protrusions 111 can hold and suspend the porous layer 12 above the concave bottom surfaces 112, creating the gap spaces g1 between the bottom side of the porous layer and the concave bottom surfaces 112.

In one embodiment, the protrusions 111 take the shape of a square-based frustum as shown in the figures. In other embodiments, the protrusions 111 may take the shape of circle, elliptical, or different polygonal-based frustum or pyramid.

Figure 5:
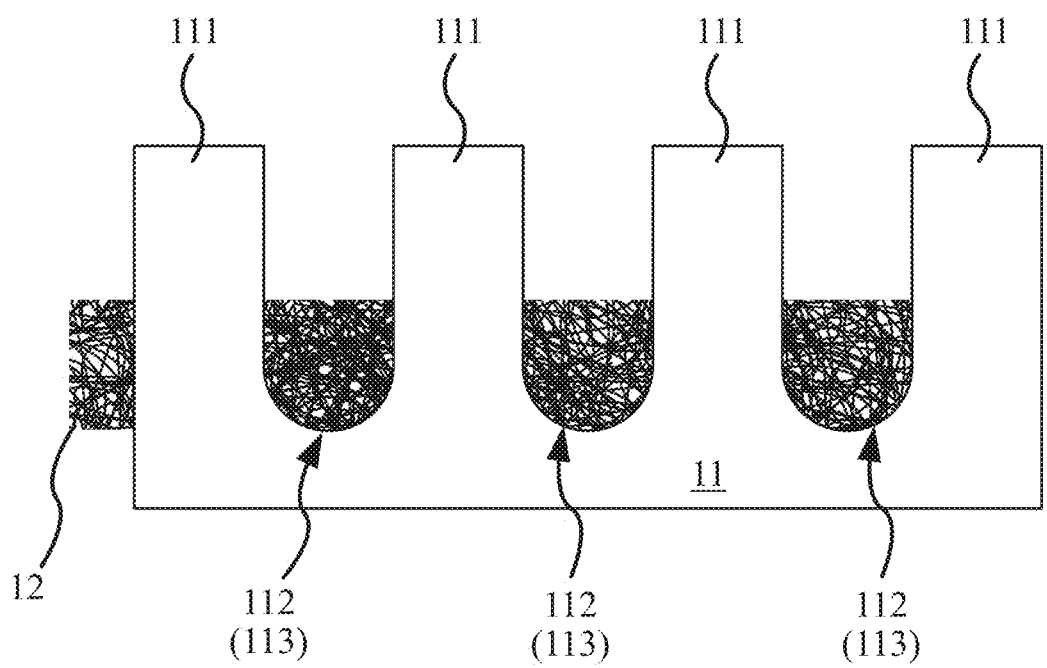
FIG. 5 depicts a side sectional view of the heat transferring device in accordance with another embodiment.

FIG. 5 is a side sectional view of a heat transferring device 1B. In some embodiment, the porous layer 12 contacts concave bottom surfaces 112. The heat transferring device 1B has a thermal conducting substrate 11 and porous layer 12, and the porous layer 12 filled the bottom of the grooves 113 of the thermal conducting substrate 11.

Figure 6:
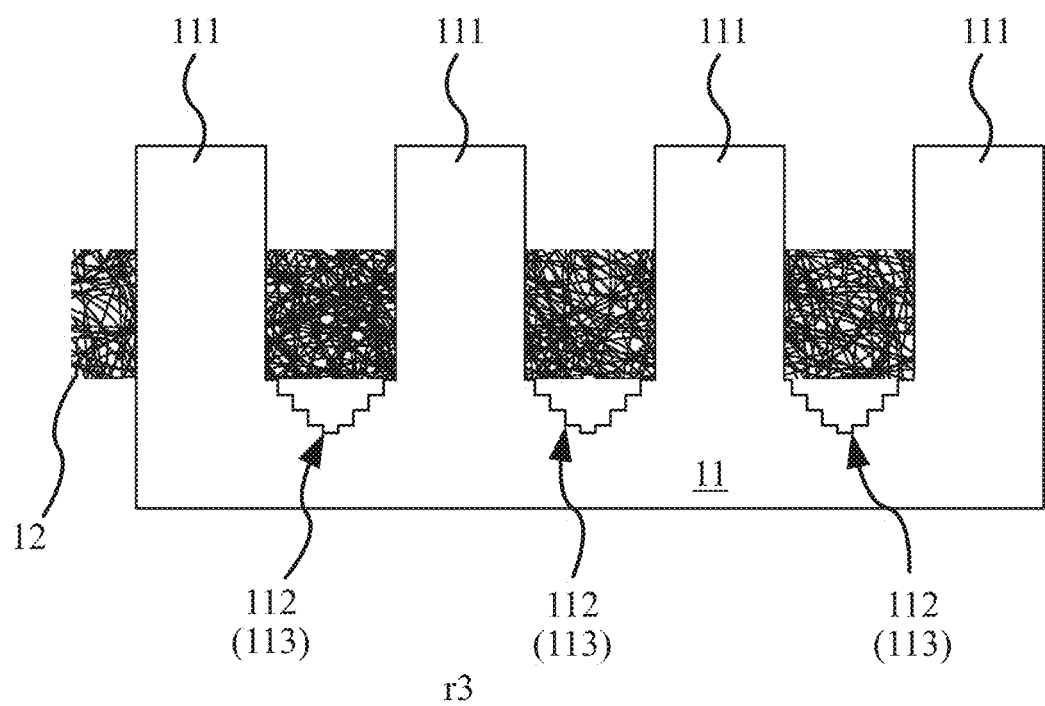
FIG. 6 depicts a side sectional view of the heat transferring device in accordance with another embodiment.

FIG. 6 is a side sectional view of a heat transferring device 1C. In some embodiments, the bottom surface 112 may form a series of steps. The stair shaped groove 113 forms the concave bottom surface 112 at valley in between the protrusions 111. The steps may hold the porous layer 12 at a precise height.

Figure 7:
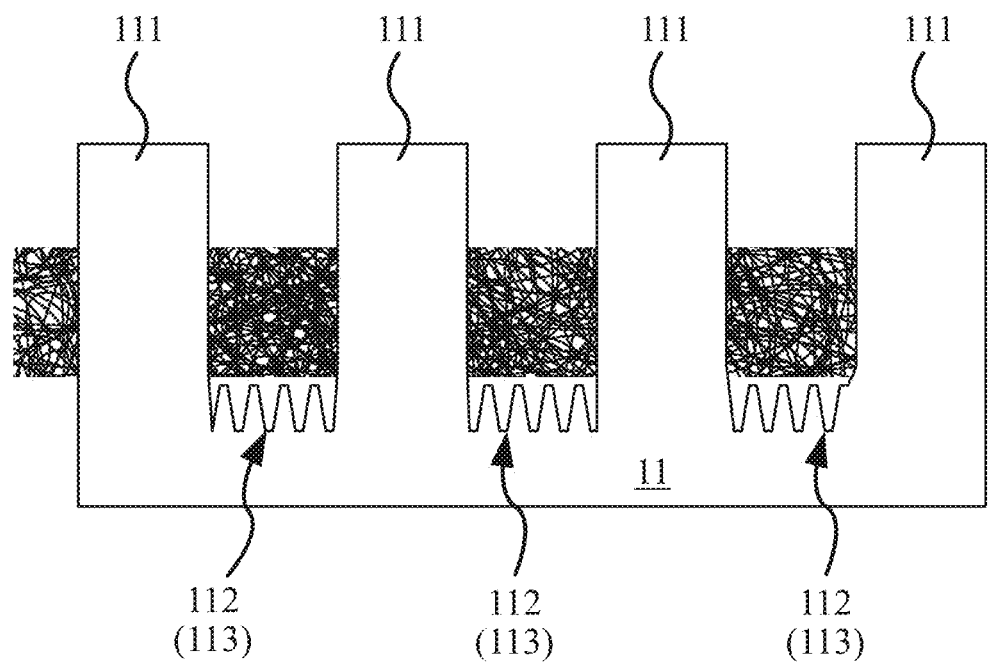
FIG. 7 depicts a side sectional view of the heat transferring device in accordance with another embodiment.

FIG. 7 is a side sectional view of a heat transferring device 1D. In some embodiments, the bottom surface 112 may form a series of teeth. The comb shaped groove 113 forms the concave bottom surface 112 at valley in between the protrusions 111. The teeth may improve the efficiency of heat dissipation.

Figure 8:
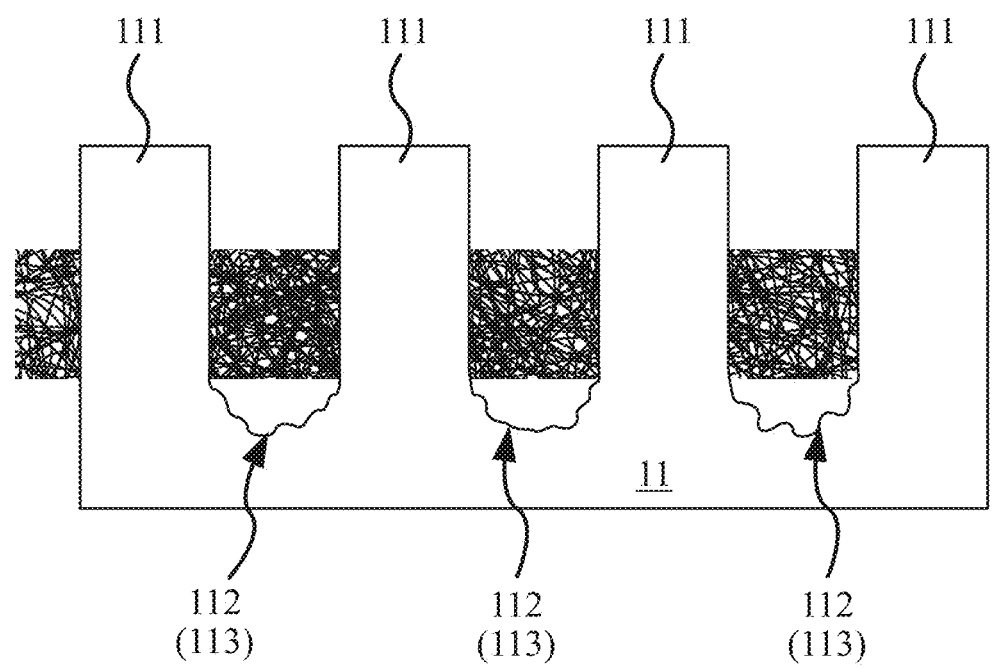
FIG. 8 depicts a side sectional view of the heat transferring device in accordance with another embodiment.

FIG. 8 is a side sectional view of a heat transferring device 1E. In some embodiments, the bottom surface 112 may have microstructures. The rough shaped groove 113 forms the concave bottom surface 112 at valley in between the protrusions 111. The microstructures may improve the efficiency of heat dissipation as well.

Figure 9:
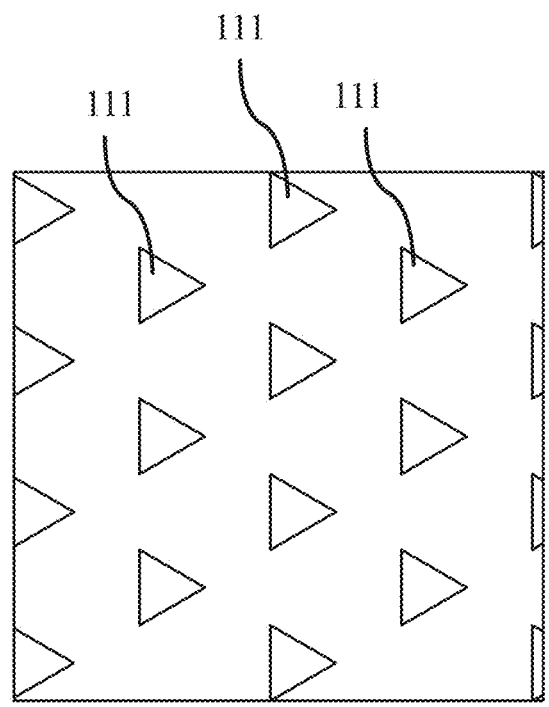
FIG. 9 depicts a top view of the thermal conducting substrate in accordance with another embodiment.

FIG. 9 is a top view of a thermal conducting substrate 11A. In some embodiments, top surfaces of the protrusions 111 are triangular. In this case, the thermal conducting substrate 11A may be applied to a triangular area more properly.

Figure 10:
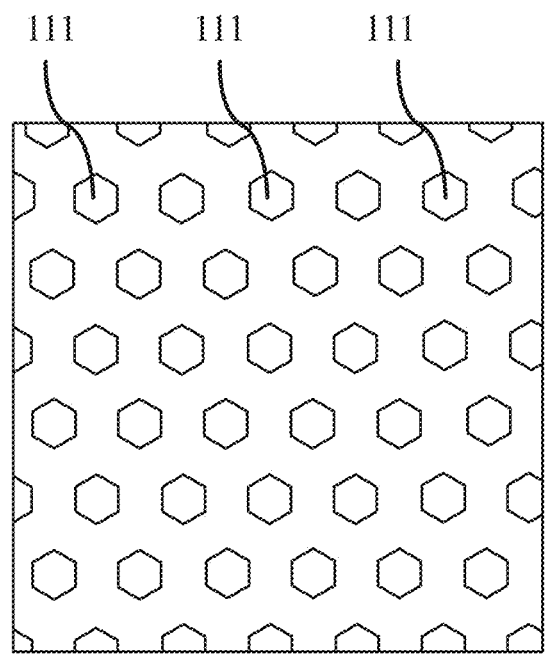
FIG. 10 depicts a top of the thermal conducting substrate in accordance with another embodiment.

FIG. 10 is a top view of a thermal conducting substrate 11B. In some embodiment, top surfaces of the protrusions 111 are hexagonal. In this case, the thermal conducting substrate 11B may be applied to a hexagonal area more properly.

A skilled person in the art would appreciate that top surfaces of the protrusions 111 may readily adopt other shapes without undue experimentation or deviation from the spirit and purpose of the present invention.

Figure 11:
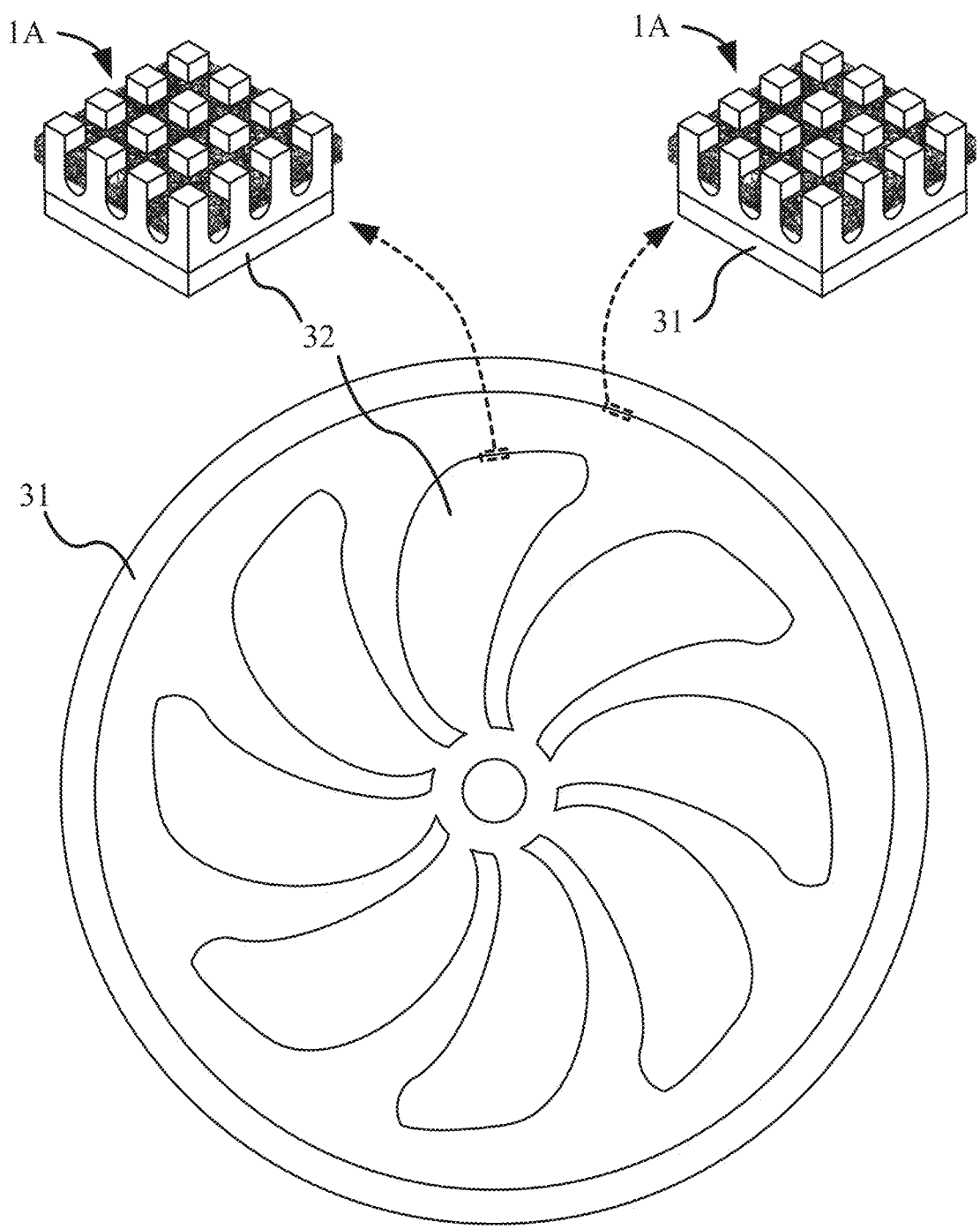
FIG. 11 depicts a schematic drawing of a high temperature material transferring system in accordance with one embodiment.

FIG. 11 is a schematic view of a high temperature material transferring system 3. The system 3 has a cylindrical container 31, and the cylindrical container 31 is configured to transfer air flow having high temperature in high speed. The heat transferring device 1A is disposed on the surface of the cylindrical container 31. Therefore, the system 3 can be cooled down with water spray easily.

In one exemplary embodiment, system 3 is an aero engine, and the system 3 further includes a plurality of blades 32. The blades 32 are disposed in the cylindrical container 31, and the heat transferring device 1A is also disposed on the surface of the blades 32. Therefore, the blades 32 may also be cooled down quickly with water spray.

In other embodiments, container 31 may take other shapes, and the heat transferring device 1A is disposed on the surface of the container 31. A skilled person in the art would appreciate that embodiments of the present invention with the heat transferring device 1A being flexible can have many different applications; for example, container 31 may be part of a flexible thermal dissipation armor.

In some embodiments, the heat transferring device 1A can be provided as a film, which can apply on the surfaces of a high-temperature material transferring system such as a power generator or reactor and piping thereof, a smelter, an explosion chamber, an engine cooling system, or a computer cooling system. In some embodiments, the heat transferring device 1A can be provided as small units, which can be mixed with liquid, such as water, to obtain a higher cooling rate suitable for use as fire extinguisher in addition to the high-temperature material transferring systems above.

In other embodiments, the thermal conducting substrate 11 may have a thickness within the range from 0.1 to 0.5 mm, and the heat transferring device 1A can be brazed or bonded to various surfaces or materials with different shapes which is hard to texture directly.

Referring to FIG. 1. The present invention also provides a method of forming the heat transferring device 1A. The method includes: providing a thermal conducting substrate 11; and forming a plurality of protrusions 111 and concave bottom surfaces 112.

In this embodiment, the thermal conducting substrate 11 is made of steel, and the protrusions 111 arrays are fabricated using wire-cutting machine. To be more specific, the wire-cutting process used Molybdenum wire with diameter of 0.18 mm to form the "U" shape groove.

In one embodiment, the thermal conducting substrate 11 and the protrusions 111 thereon are fabricated using molding, and the mold is fabricated by 3D printing. In some embodiment, the thermal conducting substrate 11 is made directly by 3D printing. In another embodiment, the thermal conducting substrate 11 is made by micro-milling.

The method of forming the heat transferring device 1A further includes embedding a porous layer 12 between the protrusions 111. In this embodiment, the porous layer 12 is fabricated via electrospinning technique.

The porous layer 12 is made of thermally insulating composite fibers. Typically, the PVA (polyvinyl alcohol) precursor solution (10 wt. %) was prepared by dissolving PVA (Mw=88,000 g·mol$^{-1}$) into deionized water at 80° C. with continuous stirring for 12 h. Then the silane sol was obtained by stirring the TEOS (tetraethoxysilane) aqueous solution with $H_3PO_4$ as hydrolysis catalyst at room temperature for 10 h, and the molar ratio of $TEOS:H_3PO_4:H_2O$=1: 0.01:10. Subsequently, 12 g silane sol was dripped to the PVA precursor solution of equal weight and stirred for another 4 h till a homogenous solution was obtained. The electrospinning was performed under an applied voltage of 18 kV, and the precursor solution was injected at a flow rate of 1 ml·h$^{-1}$. An aluminum foil-covered grounded metallic rotating roller was used as a collector. The as-spun composite fibers were dried at 80° C. for 2 h and then calcined at 800° C. in air for 2 h to remove the organics.

The embedding is using a reverse mold of the thermal conducting substrate 11. By using PDMS as material of the reverse mold, the porous layer 12 is pressed and embedded between the protrusions.

In order to further compacting and forming the heat transferring device 1A, the thermal conducting substrate 11 and the porous layer 12, which is embedded into the array with specific depth, are sintered at a temperature of 800° C. Therefore, the porous layer 12 and the thermal conducting substrate 11 is combined with good thermal conducting function.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

Moreover, in interpreting the invention, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A heat transferring device, including:
   a thermal conducting substrate having a plurality of protrusions and concave bottom surfaces, wherein the concave bottom surfaces are located between the protrusions, and the thermal conducting substrate comprises one or more of iron, nickel, cobalt, zirconium, titanium, tungsten, rhenium, molybdenum, niobium, metal-ceramics, silicon nitride, carbon nitride, tantalum carbide, or hafnium carbide; and
   a super-hydrophilic porous layer embedded between the protrusions, wherein the super-hydrophilic porous layer has a plurality of thermally insulating nanofibers interwoven together to form a fibrous structure, having pores configured to receive water droplets at low contact angles, wherein the thermally insulating nanofibers have a thermal conductivity that is N times smaller than a thermal conductivity of a material of the protrusions, and N is a number within a range from approximately 100 to 1,000;
   wherein the concave bottom surfaces of the thermal conducting substrate form a plurality of first grooves and second grooves, the first grooves intersect the second grooves, wherein the first and second grooves have U-shape profiles with the super-hydrophilic porous layer suspended above the concave bottom surfaces, creating gap spaces between a lower surface of the super-hydrophilic porous layer and the concave bottom surfaces, so as to create tunnels beneath the super-hydrophilic porous layer for vapor exhausting from received water droplets such that the heat transferring device suppresses a Leidenfrost effect, and wherein the protrusions extend higher than an upper surface of the super-hydrophilic porous layer with respect to the concave bottom surfaces.

2. The heat transferring device of claim 1, wherein the protrusions form an array.

3. The heat transferring device of claim 1, wherein circumference of each of the protrusions increases in a direction towards its bottom.

4. The heat transferring device of claim 1, wherein a material of the porous layer is inorganic.

5. The heat transferring device of claim 1, wherein the porous layer is fabricated via electrospinning technique.

6. A method of forming a heat transferring device, comprising:
   providing a thermal conducting substrate comprising one or more of iron, nickel, cobalt, zirconium, titanium, tungsten, rhenium, molybdenum, niobium, metal-ceramics, silicon nitride, carbon nitride, tantalum carbide, or hafnium carbide;
   forming a plurality of protrusions and concave bottom surfaces at the thermal conducting substrate, wherein the concave bottom surfaces are located between the protrusions and form a plurality of first grooves and second grooves, and the first grooves intersecting the second grooves; and embedding a super-hydrophilic porous layer between the protrusions such that the super-hydrophilic porous layer is suspended above U-shape profiles of the first and second grooves of the concave bottom surfaces, so as to create gap spaces between a lower surface of the super-hydrophilic porous layer and the concave bottom surfaces that create tunnels beneath the super-hydrophilic porous layer for vapor exhausting from received water droplets such that the heat transferring device suppresses a Leidenfrost effect, and such that top ends of the protrusions are higher than an upper surface of the super-hydrophilic porous layer with respect to the concave bottom surfaces, wherein the super-hydrophilic porous layer has a plurality of thermally insulating nanofibers interwoven together to form a fibrous structure, having pores configured to receive water droplets at low contact angles, the thermally insulating nanofibers has a thermal conductivity that is N times smaller than a thermal conductivity of a material of the protrusions, N is a number within a range from approximately 100 to 1,000.

7. The method of claim 6, wherein the step of forming the protrusions comprises:
wire-cutting the thermal conducting substrate with a Molybdenum wire or micro-milling the thermal conducting substrate.

8. The method of claim 6, wherein the porous layer is fabricated via electrospinning technique.

9. The method of claim 6 further comprising:
sintering the protrusions and the porous layer.

10. A high temperature material transferring system, comprising:
a cylindrical container configured to transfer air flow; and
the heat transferring device of claim 1, wherein the heat transferring device is located within the cylindrical container and connected to an interior surface of the cylindrical container.

11. The high temperature material transferring system of claim 10 further comprising a plurality of blades disposed in the cylindrical container.

12. A heat transferring device, comprising:
a thermally conducting substrate having a plurality of protrusions and concave bottom surfaces, wherein the concave bottom surfaces are located between the protrusions, the thermally conducting substrate comprising one or more of iron, nickel, cobalt, zirconium, titanium, tungsten, rhenium, molybdenum, niobium, metal-ceramics, silicon nitride, carbon nitride, tantalum carbide, or hafnium carbide; and
a super-hydrophilic porous layer positioned between the protrusions, the super-hydrophilic porous layer having a plurality of thermally insulating nanofibers interwoven together to form a fibrous structure, having pores configured to receive water droplets at low contact angles, the thermally insulating nanofibers having a thermal conductivity that is N times smaller than a thermal conductivity of a material of the protrusions, N being a number within a range from approximately 100 to 1,000;
wherein the concave bottom surfaces of the thermally-conducting substrate form a plurality of first grooves and second grooves, the first grooves intersecting the second grooves, the first and second grooves having U-shape profiles with the super-hydrophilic porous layer positioned above the concave bottom surfaces to create gap spaces between a lower surface of the porous layer and the concave bottom surfaces that create tunnels beneath the porous layer for vapor exhausting from received water droplets such that the heat transferring device suppresses a Leidenfrost effect; and
wherein a height of the plurality of protrusions extends beyond a height of the super-hydrophilic porous layer.

13. The heat transferring device of claim 12, wherein the nanofibers of the super-hydrophilic porous layer include one or more of carbon, aramid, glass, basalt, polybenzimidazole, ultra-high-molecular-weight-polyethylene, silicon dioxide, titanium dioxide, mullite, aluminum oxide, zirconium dioxide, yttrium oxide, or asbestos.

14. The heat transferring device of claim 12, wherein the protrusions form a thermal bridge to direct thermal flow away from the thermally-conducting substrate to reduce thermal transfer to the received water droplets in the super-hydrophilic porous layer.

* * * * *